(12) United States Patent
Ko et al.

(10) Patent No.: US 12,637,135 B2
(45) Date of Patent: May 26, 2026

---

(54) ELECTRONIC POWER STEERING APPARATUS

(71) Applicant: HL MANDO CORPORATION, Gyeonggi-do (KR)

(72) Inventors: Kyung Min Ko, Seoul (KR); Jung Sik Park, Gyeonggi-do (KR); Sang Hee Ahn, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 1134 days.

(21) Appl. No.: 17/256,649

(22) PCT Filed: Jun. 25, 2019

(86) PCT No.: PCT/KR2019/007642
§ 371 (c)(1),
(2) Date: Dec. 29, 2020

(87) PCT Pub. No.: WO2020/004897
PCT Pub. Date: Jan. 2, 2020

(65) Prior Publication Data
US 2021/0261188 A1 Aug. 26, 2021

(30) Foreign Application Priority Data

Jun. 29, 2018 (KR) ........................ 10-2018-0075860
Aug. 28, 2018 (KR) ........................ 10-2018-0101333
(Continued)

(51) Int. Cl.
*B62D 5/04* (2006.01)
*B62D 6/10* (2006.01)
*F16H 37/12* (2006.01)

(52) U.S. Cl.
CPC ......... *B62D 5/0448* (2013.01); *B62D 5/0454* (2013.01); *B62D 5/046* (2013.01); *B62D 6/10* (2013.01); *F16H 37/122* (2013.01)

(58) Field of Classification Search
CPC .......... B62D 3/08; B62D 5/0421; B62D 5/04; B62D 5/0448; B62D 5/0454; B62D 5/046;
(Continued)

(56) References Cited

U.S. PATENT DOCUMENTS

| | | | |
|---|---|---|---|
| 5,667,313 A | 9/1997 | Kapaan et al. | |
| 5,839,321 A | 11/1998 | Siemons | |

(Continued)

FOREIGN PATENT DOCUMENTS

| | | |
|---|---|---|
| CN | 102689649 | 9/2012 |
| CN | 206086859 | 4/2017 |

(Continued)

OTHER PUBLICATIONS

Office Action dated Dec. 13, 2022 for Korean Patent Application No. 10-2018-0075860 and its English translation provided by Global Dossier.

(Continued)

*Primary Examiner* — Valentin Neacsu
*Assistant Examiner* — Felicia L. Brittman-Alabi
(74) *Attorney, Agent, or Firm* — WOMBLE BOND DICKINSON (US) LLP

(57) ABSTRACT

An electronic power steering apparatus, according to one embodiment of the present invention, comprises: an output shaft rotated by means of a reduction gear connected to a driving motor; a ball screw having an upper end coupled to a lower end of the output shaft, and having outer circumferential screw grooves formed on an outer circumferential surface thereof to rotate in conjunction with the output shaft;

(Continued)

a ball nut having gear teeth formed on an outer circumferential surface thereof and inner circumferential screw grooves corresponding to the outer circumferential screw grooves formed on an inner circumferential surface thereof, the ball nut being coupled to the ball screw via a ball and sliding in an axial direction; and a sector shaft, coupled to the gear teeth of the ball nut, for operating a pitman arm while rotating during the axial sliding of the ball nut.

19 Claims, 13 Drawing Sheets

(30) Foreign Application Priority Data

| | | |
|---|---|---|
| Sep. 21, 2018 | (KR) ........................ | 10-2018-0114119 |
| Sep. 21, 2018 | (KR) ........................ | 10-2018-0114134 |

(58) Field of Classification Search
CPC ..... B62D 6/10; F16H 25/2204; F16H 37/122; F16H 2025/209
USPC ........................................................ 180/446
See application file for complete search history.

(56) References Cited

U.S. PATENT DOCUMENTS

| | | | |
|---|---|---|---|
| 2012/0241244 A1 | 9/2012 | Escobedo et al. | |
| 2013/0292201 A1* | 11/2013 | Yamanaka .............. | B23P 19/04 |
| | | | 180/402 |
| 2015/0298728 A1 | 10/2015 | Yoda et al. | |
| 2018/0244305 A1* | 8/2018 | Cai ...................... | B62D 5/0421 |
| 2018/0292294 A1* | 10/2018 | Yamada ................ | G01M 17/06 |

FOREIGN PATENT DOCUMENTS

| | | | | | |
|---|---|---|---|---|---|
| CN | 107110330 | | 8/2017 | | |
| CN | 107207039 | | 9/2017 | | |
| CN | 107416011 | | 12/2017 | | |
| CN | 108177686 A | * | 6/2018 | .............. | B62D 3/08 |
| DE | 10 2012 204 318 | | 9/2012 | | |
| DE | 102011014922 A1 | * | 9/2012 | .............. | B62D 3/12 |
| DE | 10 2021 213 127 | | 6/2022 | | |
| JP | 5-124527 | | 5/1993 | | |
| JP | 2001-171531 | | 6/2001 | | |
| JP | 2005-67280 | | 3/2005 | | |
| JP | 2005-306317 | | 11/2005 | | |
| JP | 2006-151182 | | 6/2006 | | |
| JP | 2007-57012 | | 3/2007 | | |
| JP | 2007-113628 | | 5/2007 | | |
| JP | 2013-212837 | | 10/2013 | | |
| KR | 10-2010-0038894 | | 4/2010 | | |
| KR | 10-2013-0098815 | | 9/2013 | | |
| KR | 10-2014-0141114 | | 12/2014 | | |
| KR | 10-1477855 | | 12/2014 | | |
| KR | 10-2017-0040493 | | 4/2017 | | |
| KR | 10-2017-0093031 | | 8/2017 | | |
| KR | 10-2018-0045236 | | 5/2018 | | |
| WO | WO-2020009075 A1 | * | 1/2020 | ............. | B62D 15/02 |

OTHER PUBLICATIONS

Office Action dated Apr. 27, 2023 for Korean Patent Application No. 10-2018-0075860 and its English translation provided by Global Dossier.

International Search Report for PCT/KR2019/007642 mailed on Oct. 25, 2019 and its English translation from WIPO (now published as WO 2020/004897).

Written Opinion of the International Searching Authority for PCT/KR2019/007642 mailed on Oct. 25, 2019 and its English translation from WIPO (now published as WO 2020/004897).

Office Action mailed on Aug. 23, 2022 for Chinese Patent Application No. 201980054094.1 and its English translation from Global Dossier.

International Preliminary Report on Patentability for PCT/KR2019/007642 issued on Dec. 29, 2020 and its English translation from WIPO (now published as WO 2020/004897).

Office Action mailed on Aug. 22, 2023 for Korean Patent Application No. 10-2018-0101333 and its English translation from Global Dossier.

Office Action dated Mar. 30, 2023 for Chinese Patent Application No. 201980054094.1 and its English translation provided by Global Dossier.

Office Action dated Nov. 10, 2025 for German Patent Application No. 11 2019 003 315.8, and its English translation by Google Translate.

* cited by examiner

ELECTRONIC POWER STEERING APPARATUS

CROSS-REFERENCE TO RELATED APPLICATIONS

This application is the U.S. National Phase of International Patent Application No. PCT/KR2019/007642 filed on Jun. 25, 2019, which claims the priority to Korean Patent Application No. 10-2018-0075860 filed on Jun. 29, 2018, Korean Patent Application No. 10-2018-0101333 filed on Aug. 28, 2018, Korean Patent Application No. 10-2018-0114119 filed on Sep. 21, 2018, and Korean Patent Application No. 10-2018-0114134 filed on Sep. 21, 2018, the entire contents of which are incorporated herein by reference.

TECHNICAL FIELD

The present invention relates to an electronic steering device, and more particularly, electronic power steering, automatic parking, lane maintenance, driving assistance according to road surface conditions, autonomous driving and the like even in commercial vehicles such as trucks and buses that require relatively large steering power compared to passenger cars. Thus, the present invention relates to an electronic steering device that enables such implementations of driver assistance functions and steer-by-wire systems.

BACKGROUND TECHNOLOGY

In general, a vehicle steering device is a device that enables a vehicle to change its traveling direction. The steering device changes the driving direction of the vehicle by changing the center of rotation of the vehicle's front wheel.

On the other hand, the power assisted steering system is a device that assists the driver's steering wheel manipulation force when the driver manipulates the vehicle's steering wheel so that the vehicle's travel direction can be easily changed with a small force.

A power-assisted steering system is generally classified as an EPS: Electronic Power Steering Apparatus or a HPS: Hydraulic Power Steering Apparatus.

In the hydraulic steering system, when a hydraulic pump connected to a rotation shaft of the engine supplies operating oil to an operating cylinder connected to a rack bar, the piston of the operating cylinder supplied with hydraulic oil moves to assist the steering operation force, allowing the driver to steer with a small force.

The electronic steering system is equipped with a motor instead of a hydraulic pump and an operating cylinder, and is a steering device that assists the operating force of the steering wheel with the power of the motor. The conventional electric steering apparatus provides a lower level of steering assistance power compared to the hydraulic steering apparatus due to an output problem.

Accordingly, hydraulic steering devices are used in commercial vehicles such as trucks and buses that require relatively large steering power compared to passenger vehicles. However, unlike the electric steering device, the hydraulic steering device has a problem that functions such as automatic parking, lane maintenance, and autonomous driving using an electronic control unit cannot be used.

Therefore, there is a need for the development of technologies that enable automatic parking, lane maintenance, and autonomous driving using an electronic control unit even for trucks and buses that require relatively large steering power compared to passenger cars.

DETAILED DESCRIPTION OF THE INVENTION

The Technical Problem

Accordingly, the present invention has been conceived from the above-described background, and an object of the present invention is to provide an electric steering apparatus that enables electric power steering to be applied to a truck or bus that requires relatively large steering power compared to a passenger car.

In addition, the present invention aims to provide an electric steering system that enhances the driver's convenience by enabling driver assistance functions such as automatic parking, lane maintenance, driving assistance according to road surface conditions, and autonomous driving control to be used even in commercial vehicles such as trucks and buses.

In addition, the present invention aims to provide an electric steering device that effectively secures redundancy for enhancing safety.

In addition, an object of the present invention is to provide an electric steering device that enables a steer-by-wire system to be implemented in commercial vehicles such as trucks and buses.

The object of the present invention is not limited by the objects presented above, and other objects not mentioned will be clearly understood by those skilled in the art from the following description.

Solution to the Technical Problem

According to an embodiment of the present invention, an electronic steering device, comprising: an output shaft rotated by a reduction gear connected to a drive motor; a ball screw rotatable in conjunction with said output shaft, wherein said ball screw has an upper end coupled to a lower end of said output shaft, and wherein said ball screw has outer peripheral screw threads formed on an outer peripheral surface thereof; a ball nut having gear teeth formed on an outer peripheral surface thereof and inner peripheral screw threads formed on an inner peripheral surface thereof, wherein said inner peripheral screw threads correspond to said outer peripheral screw threads, wherein said ball nut is coupled to said ball screw via a ball, and wherein said ball nut slides in an axial direction; and a sector shaft coupled to said gear teeth of said ball nut for operating a pitman arm by rotating while said ball nut slides in an axial direction is provided.

Here, said reduction gear may comprise: a first gear member which rotates by being coupled to said drive motor and has gear teeth formed on an outer peripheral surface thereof; and a second gear member which is a disc-shaped member to which said output shaft is coupled, and which rotates said output shaft when said drive motor rotates, wherein said second gear member has gear teeth formed on an outer peripheral surface thereof to be meshed with said first gear member.

In addition, the electronic steering device may further comprise: a first rotation support member disposed between a housing thereof and an external circumference of an upper end of said ball screw to support the rotation of said ball screw; and a second rotation support member disposed between a housing thereof and an outer peripheral surface of a lower end of said ball screw to support the rotation of said ball screw.

In addition, the first battery support member and the second rotation support member may be formed of tapered roller bearings.

In addition, the first rotation support member and the second rotation support member may be formed of a thrust bearing.

In addition, the electronic steering device may further comprise: an axial support member that is coupled to an inner peripheral surface of a lower end of said housing and supports said second rotation support member in the axial direction.

In addition, said axial support member may comprise: a first support member equipped with a first support part protruding from an outer peripheral surface in the axial direction having a protrusion increasing in the peripheral direction, and inserted into an inner peripheral surface of a lower end of said housing to support the second rotation support member in the axial direction; a second support member protruding in a shape corresponding to said first support member and having a second support part engaged with said first supporting part, and coupled to an inner peripheral surface of a lower end portion of said housing; and an elastic member disposed between said first support member and said second support member, wherein one end thereof is coupled to said first support member and the other end thereof is coupled to said second support member to generate an elastic force in a peripheral direction.

In addition said axial support member may comprise: a first lock nut inserted into the inner peripheral surface of a lower end of the housing to support the second rotation support member in the axial direction; a cover member that covers the lower end of the housing and is joined together; and a second lock nut disposed between the cover member and the first lock nut to prevent loosening of the first lock nut.

In addition, said drive motor may comprise a first drive motor and a second drive motor, wherein said first gear member comprises a first worm coupled to the first driving motor to rotate and a second worm coupled to the second driving motor to rotate, wherein the second gear member is composed of a worm wheel meshed with the first worm and the second worm.

In addition, the first worm and the second worm may be arranged side by side on both sides of the second gear member.

In addition, the rotational shafts of the first worm and the second worm may each be disposed perpendicular to the rotational axis of the second gear member.

In addition, the first driving motor and the second driving motor may be disposed by being arranged side by side.

In addition, the first driving motor and the second driving motor may independently be controlled by an electronic unit.

In addition, the electronic steering device may further comprise: an input member wherein an upper end is connected to a steering shaft, and connected to said output shaft.

In addition, the electronic steering device may further comprise: a torsion bar arranged to be twisted according to the rotation of the input shaft; and a torque sensor which transmit the torsion bar distortion information to the electronic control unit.

In addition, the electronic control unit may control the driving motor based on the torsion information of the torsion bar.

In addition, the output shaft may not be mechanically connected to the steering wheel, and the driving motor may not be controlled by the electronic control unit based on the steering angle detected by the angle sensor when the steering wheel is operated.

In addition, the sector shaft may be engaged with the gear teeth of the ball nut so that the ball nut rotates in one side in the axial direction in the sliding seal direction, and may rotate in the other direction when the ball nut slides in the other axial direction.

According to another embodiment of the invention an electronic steering device, comprising: an output shaft rotated by a reduction gear connected to a drive motor; a ball screw wherein an upper end is coupled to the lower end of the output shaft, and an outer screw groove is formed on the outer peripheral surface to rotate in connection with the output shaft; and a ball nut wherein a gear tooth is formed on the outer peripheral surface, and an inner main screw groove corresponding to the outer main screw groove is formed on the inner peripheral surface, wherein the driving motor includes a first driving motor and a second driving motor, wherein the reduction gear rotates by being engaged with a first worm coupled to the first driving motor and rotating, a second worm coupled to the second driving motor to rotate, and engaged with the first worm and the second worm is provided. It may include a worm wheel.

Here, the first worm and the second worm may be arranged side by side on both sides of the worm wheel.

In addition, the rotation axis of the first worm and the second worm may each be disposed perpendicular to the rotation axis of the worm wheel.

In addition, the first driving motor and the second driving motor are arranged adjacent to each other.

In addition, the first driving motor and the second driving motor may each independently be controlled by an electronic unit.

Effect of the Invention

According to the embodiments of the present invention, electric power steering can be applied to a truck or bus that requires a relatively large steering force compared to a passenger car through a drive motor and a reduction gear.

In addition, according to embodiments of the present invention, it is possible to apply an electric steering device instead of a hydraulic steering device to a commercial vehicle such as a truck or a bus, so that driver assistance functions such as automatic parking, lane maintenance, driving assistance according to the road surface condition, autonomous driving control can be implemented in commercial vehicles.

In addition, according to the exemplary embodiments of the present invention, it is possible to improve safety by effectively securing redundancy through two driving motors.

In addition, according to embodiments of the present invention, since the electric steering device can be applied to a commercial vehicle such as a truck or a bus, a Steer-By-Wire system can be implemented in a commercial vehicle.

MODE FOR CARRYING OUT THE INVENTION

Figure 1:
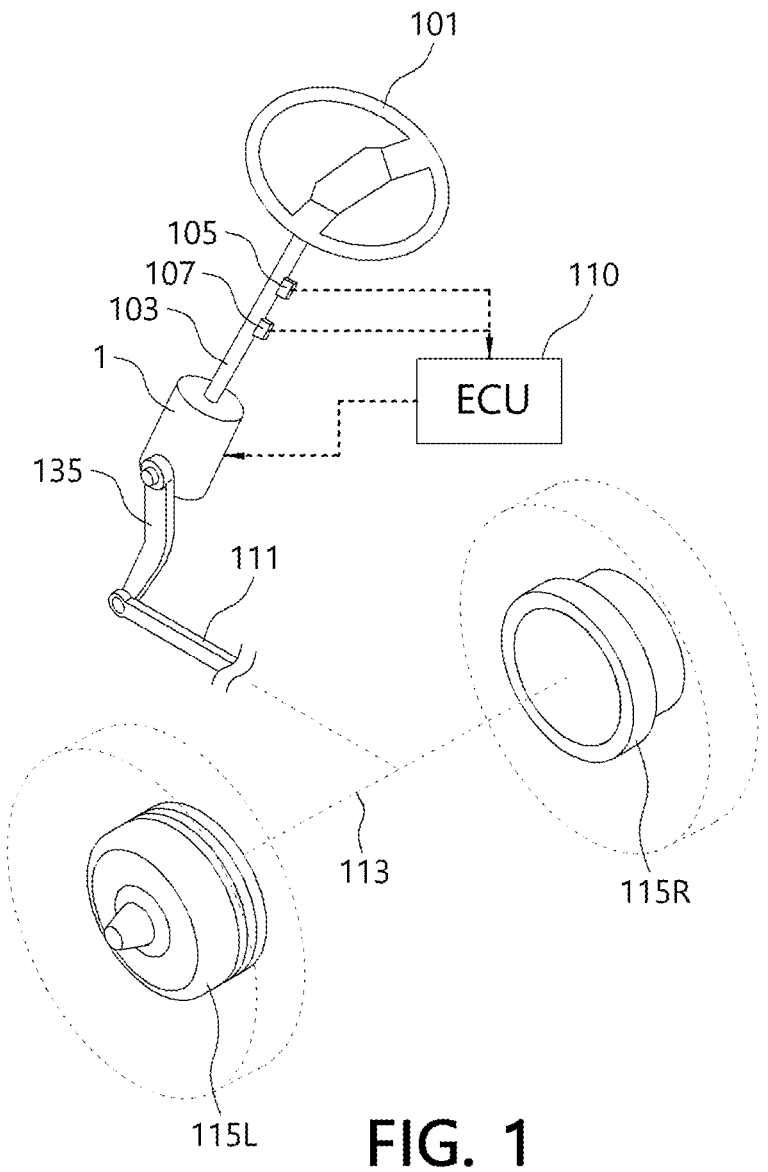
FIG. 1 is a diagram schematically showing a steering system to which an electric steering apparatus according to embodiments of the present invention is applied.

Hereinafter, some embodiments of the embodiments of the present invention will be described in detail through exemplary drawings. In adding reference numerals to elements of each drawing, it should be noted that the same elements are to have the same numerals as possible even if they are indicated on different drawings. In addition, in describing the embodiments of the present invention, when it is determined that a detailed description of a related public configuration or function may obscure the gist of the embodiments of the present invention, the detailed description will be omitted.

In addition, in describing the constituent elements of the embodiments of the present invention, terms such as first, second, third, and the like may be used. These terms are only intended to distinguish the component from other components, and the nature, order, or order of the component is not limited by the term. When a component is "connected", "coupled" or "connected" to another component, that component may be directly connected or connected to that other component, but between each component it should be understood that components may be "connected", "coupled" or "connected".

FIG. 1 is a diagram schematically showing a steering system to which an electric steering apparatus according to embodiments of the present invention is applied.

Referring to FIG. 1, a steering system to which an electric steering device according to embodiments of the present invention is applied is configured to assist the driver's steering force by an electric steering device 1. An angle sensor 105 and a torque sensor 107 are coupled to one side of the steering shaft 103 connected to the steering wheel 101. When the driver manipulates the steering wheel 101, the angle sensor 105 and the torque sensor 107 detect this and transmit an electrical signal according to the detection result to the electronic control unit 110. Further, the electronic control unit 110 transmits an operation signal to the electric steering device 1.

In more detail, the electronic control unit 110 is based on the electric signals transmitted from the angle sensor 105 and the torque sensor 107 and the electric signals transmitted from various other sensors mounted on the vehicle. It controls the drive motor of the device 1. The drive motor operates the pitman arm 135 connected to the sector shaft through a reduction gear, and the link 111 connected to the pitman arm 135 connects the link 113 connected to the wheels (115L 115R) on both sides. By moving it, steering of both wheels (115L and 115R) is achieved.

In FIG. 1, only the angle sensor 105 and the torque sensor 107 are shown for convenience of explanation, but the vehicle speed sensor is used to provide information related to the control of the electric steering device 1 to the electronic control unit 110. Motor rotation angle sensor, motor position sensor, radar, lidar, camera image sensor, etc. may be additionally provided. Detailed descriptions of these various sensors will be omitted.

Figure 2:
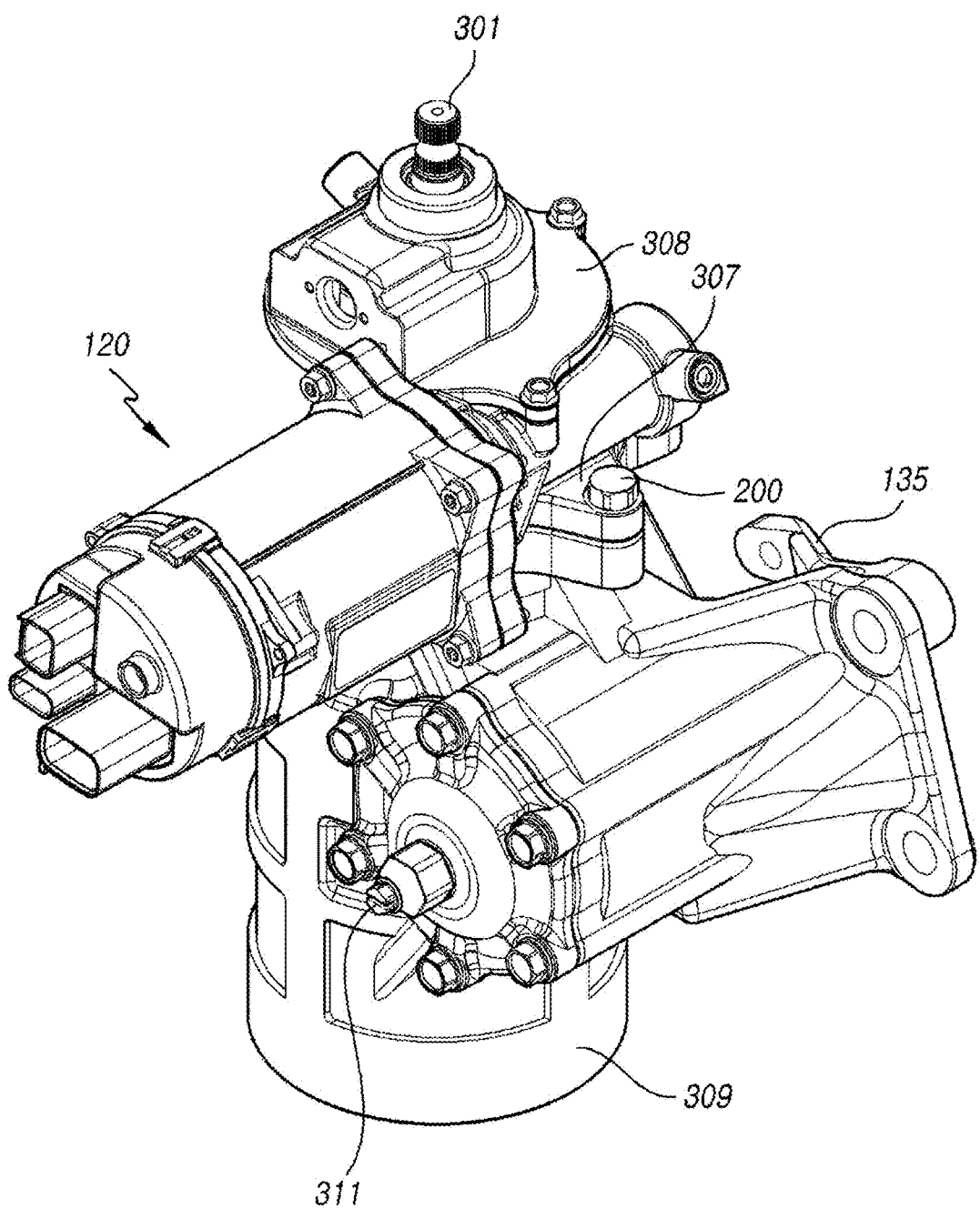
FIG. 2 is a perspective view of an electric steering apparatus according to a first embodiment of the present invention.
Figure 3:
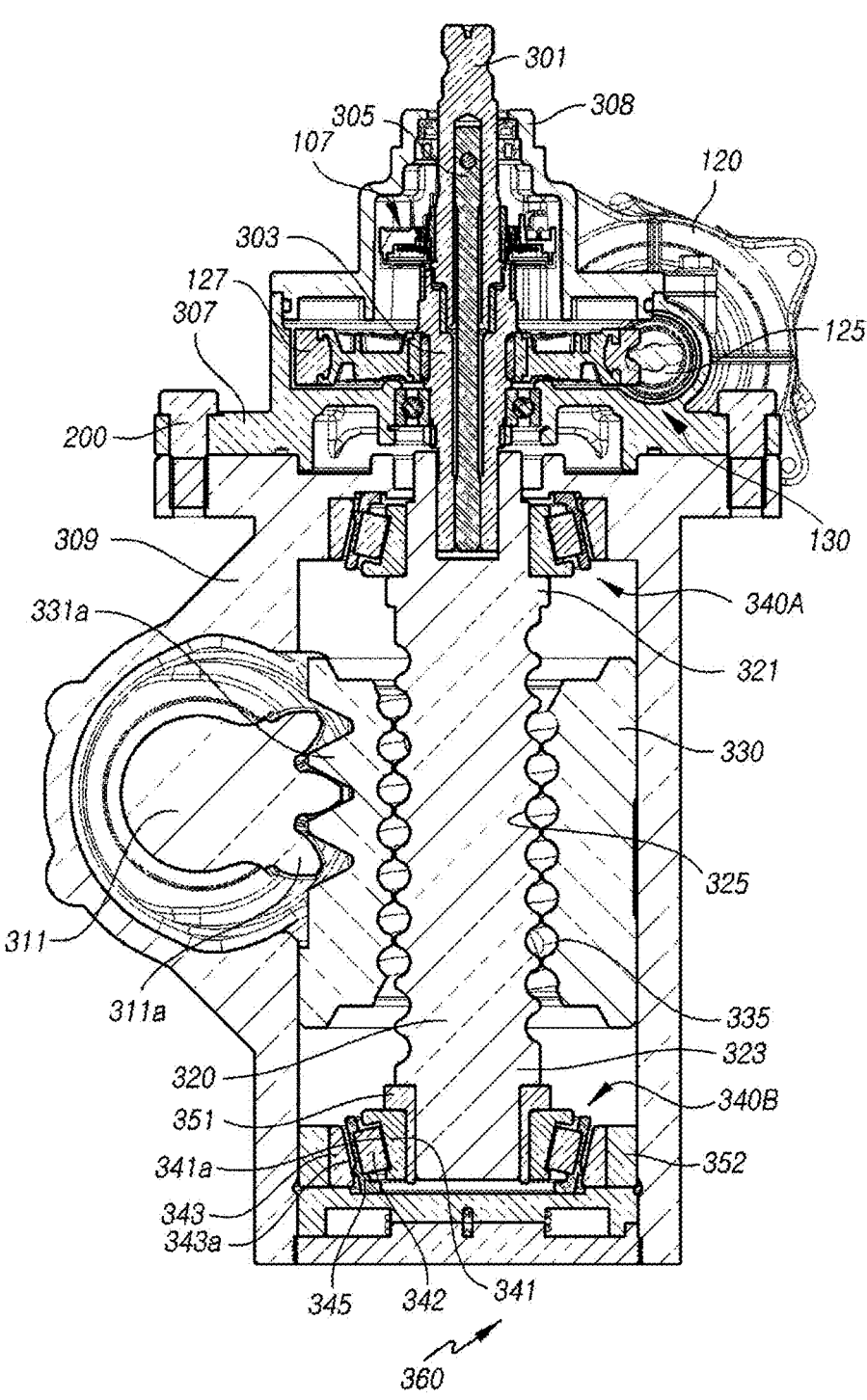
FIG. 3 is a cross-sectional view of an electric steering apparatus according to a first embodiment of the present invention.

FIG. 2 is a perspective view of an electric steering apparatus according to the first embodiment of the present invention, and FIG. 3 is a cross-sectional view of the electric steering apparatus according to the first embodiment of the present invention.

Referring to FIG. 2 and FIG. 3, the electric steering apparatus according to the first embodiment of the present invention includes an output shaft 303, a ball screw 320, a ball nut 330, and a sector shaft 311.

The output shaft 303 is coupled with an input shaft 301 whose upper end is connected to the steering shaft 103 and rotates by a reduction gear 130 connected to the driving motor 120. The upper end of the ball screw 320 is coupled to the lower end of the output shaft 303, and an outer screw groove 325 is formed on the outer peripheral surface thereof to rotate in connection with the output shaft 303. The ball nut 330 has a gear tooth 331a formed on the outer peripheral surface, and an inner peripheral screw groove 335 corresponding to the outer peripheral screw groove 325 is formed on the inner peripheral surface, and is combined with the ball screw 320 through the ball. It slides in the axial direction. The sector shaft 311 is coupled with the gear teeth 331a of the ball nut 330 to rotate when the ball nut 330 slides in the axial direction to operate the pitman arm 135.

The upper end of the output shaft 303 is coupled to the input shaft 301 connected to the steering shaft 103 and rotated by the reduction gear 130 connected to the driving motor 120. Here, the input shaft 301 may be connected to the steering shaft 103 or replaced with the steering shaft 103.

That is, when the steering shaft 103 is integrally provided according to the engine room layout of the vehicle, the steering shaft 103 itself may be the input shaft 301. Meanwhile, when the steering shaft 103 is bent by a universal joint or the like and two or more are provided, the steering shaft 103 may be connected to the input shaft 301.

In the first embodiment of the present invention, the input shaft 301 and the output shaft 303 are formed as hollow element so that the torsion bar 305 is coupled to the inner space. In addition, a torque sensor 107 for sensing a steering torque generated when the driver manipulates the steering wheel may be provided on the outer peripheral shaft of the input shaft 301.

The ball screw 320 is coupled to the lower end of the output shaft 303 and rotates in conjunction with the output shaft 303. The ball screw 320 has an outer peripheral screw groove 325 formed on the outer peripheral surface.

The ball nut 330 is coupled with the ball screw 320 with a ball as a medium. The ball nut 330 has an inner main screw groove 335 corresponding to the outer screw groove 325 of the ball screw 320 on the inner peripheral surface, so that when the ball screw 320 rotates, it slides in the axial direction.

The sector shaft 311 is coupled with a gear tooth 331a formed on the outer peripheral surface of the ball nut 330. Accordingly, the sector shaft 311 rotates when the ball nut 330 slides in the axial direction and operates the pitman arm 135. In more detail, the sector shaft 311 rotates in one direction when the ball nut 330 slides toward one side in the axial direction, and the ball nut 330 slides toward the other side in the axial direction. It is engaged with the gear teeth 331a of the ball nut 330 to rotate in the other direction.

The reduction gear 130 rotates the output shaft 303 by the driving force of the driving motor 120. The reduction gear 130 is coupled with the driving motor 120 to rotate in conjunction with the first gear member 125 having a gear tooth formed on the outer peripheral surface, and a coupling hole in which the output shaft 303 is coupled at the center. It includes a second gear member 127 that rotates the output shaft 303 when the drive motor 120 rotates by having a gear tooth meshed with the first gear member 125 on the outer peripheral surface.

The first gear member 125 is connected to and interlocked with the shaft of the drive motor 120 and rotates while rotating the second gear member 127. In the first embodiment of the present invention, the first gear member 125 is made of a worm gear, and the second gear member 127 is made of a worm wheel.

However, the type and shape of the first gear member 125 and the second gear member 127 are not limited by the first embodiment of the present invention, and a bevel gear or the like may be applied in addition to the worm-worm wheel.

In the first embodiment of the present invention, a first rotation support member 340A for supporting rotation of the ball screw 320 is provided between the outer peripheral surface of the upper end of the ball screw 320 and the housing 309.

Here, the first rotation support member 340A is configured of a tapered roller bearing to support loads in the axial and radial directions with the rotation of the ball screw 320.

Figure 4:
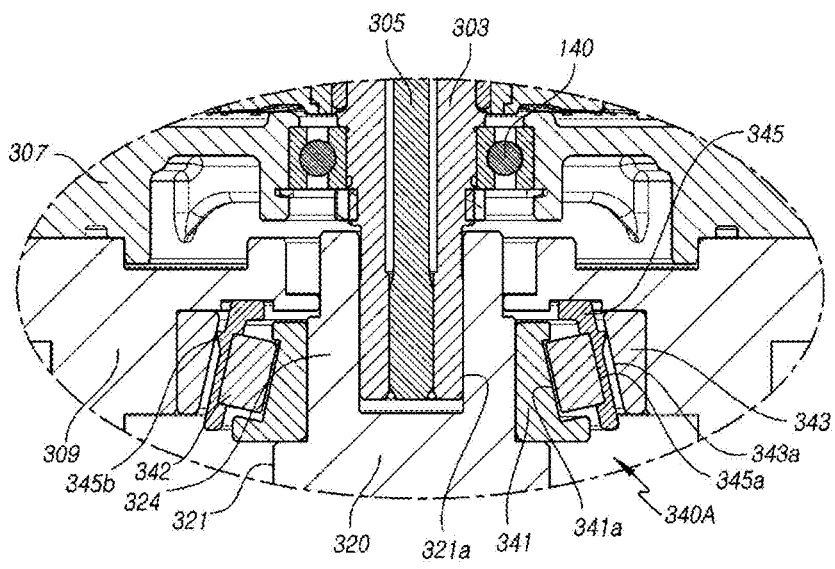
FIG. 4 and FIG. 5 are enlarged diagrams of a part of each of FIG. 3.

Referring to FIG. 4, the first rotation support member 340A includes an inner member 341 to which the outer peripheral surface of the outer peripheral end of the ball screw 320 is coupled, and an outer member 343 coupled to the inner peripheral surface of the housing 309. It includes a cylindrical rolling member 342 provided between the inner member 341 and the outer member 343.

In the first embodiment of the present invention, the first gear member 125 and the second gear member 127 are built in the upper side of the housing 309 in which the ball screw 320 and the ball nut 330 are embedded. The upper housing 307 and the fixing member 200 are coupled to each other, and a top cover 308 is coupled to the upper side of the upper housing 307.

An upper end jaw portion 321 is formed on the outer peripheral surface of the upper end of the ball screw 320, and the lower end of the inner member 341 is supported and coupled to the upper end jaw portion 321.

The upper end 324 of the ball screw 320 on which the radially inner peripheral surface of the inner member 341 is supported is provided with a coupling hole 321a to which the output shaft 303 supported by the ball bearing 140 is coupled.

An intermediate support member 345 is provided between the inner member 341 and the outer member 343. On the inner peripheral surface of the intermediate support member 345, a seating groove 345a is formed in which the rolling member 342 is supported and rotates.

The inner peripheral surface of the inner member 341 is provided with a support groove 341a in which the rolling member 342 is supported and rotates. The outer peripheral surface of the upper rolling member 342 is supported by the support groove 341a and the seating groove 345a and rotates.

Here, the locking jaws formed on the upper side of the support groove 341a and the locking jaws formed on the lower side are formed with a predetermined gap with the upper end of the rolling member 342. Accordingly, the intermediate support member 345 and the rolling member 342 may flow in the axial direction.

In addition, the inner peripheral surface of the outer member 343 and the outer peripheral surface of the intermediate support member 345 are formed as inclined surfaces corresponding to the support groove 341a and the seating groove 345a, and these inclined surfaces are in the downward direction of the ball screw 320. It is formed in a direction of increasing diameter.

In addition, a plurality of elastic protrusions 345b are formed to protrude from the outer peripheral surface of the intermediate support member 345 by being spaced apart in the peripheral direction. Accordingly, the intermediate support member 345 may be elastically supported on the inner peripheral surface 343a of the outer member 343.

Therefore, when the flow in the axial direction occurs due to the impact load input back to the ball screw 320 through the sector shaft 311, the elastic protrusion 345b is elastically deformed and the flow in the axial direction is made and the impact load is absorbed.

In addition, in the first embodiment of the present invention, a second rotation support member 340B for supporting rotation of the ball screw 320 is provided between the outer peripheral surface of the lower end of the ball screw 320 and the housing 309.

Here, the second rotation support member (340B) is for supporting the load in the axial direction and the radial direction along with the rotation of the ball screw 320, and consists of a tapered roller bearing in the same manner as the first rotation support member (340A). And is coupled to the first rotation support member 340A in a vertically symmetrical direction.

Figure 5:
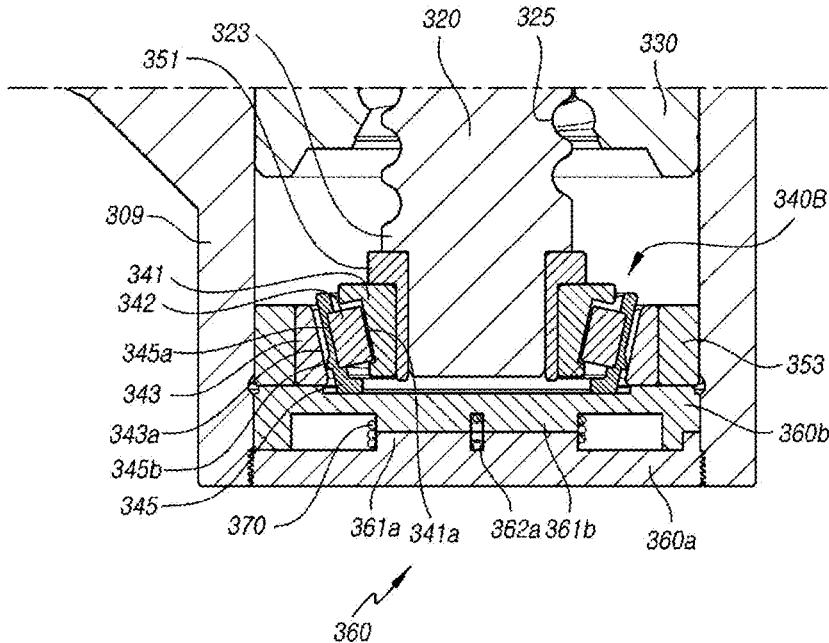

With reference to FIG. 5, an inner bush 351 is coupled between the outer peripheral surface of the lower end of the ball screw 320 and the second rotation support member 340B. Also, an outer bush 353 is coupled between the inner peripheral surface of the housing 309 and the second rotation support member 340B.

As is the case for the first rotation support member 340A, the second rotation support member 340B comprises an inner member 341 coupled to the outer peripheral side of the inner bush 351, an outer member 343 coupled to the inner peripheral side of the outer bush 353, and a rolling member 342 provided between the inner member 341 and the outer member 343.

A lower end jaw portion 323 is formed on the outer peripheral surface of the lower end of the ball screw 320, and the upper end of the inner bush is supported by and coupled to the lower end jaw portion 323 of the ball screw 320.

And between the inner member 341 and the outer member 343, a rolling member 342 is supported on the inner peripheral surface and an intermediate support member 345 in which a rotating seating recess 345a is formed may be provided therein.

On the outer peripheral surface of the inner member 341 is provided a support recess 341a that rotates by supporting the rolling member 342. The support recess 341a and the seating recess 345a are formed as an inclined surface formed to incline with the axial direction, so that the outer peripheral surface of the cylindrical rolling member 342 is supported by the support recess 341a and the seating recess 345a and rotates.

Here, the locking jaws formed on the upper side of the support recess 341a and the locking jaws formed on the lower side form the upper and lower ends of the rolling member 342 and a predetermined gap. Accordingly, the intermediate support member 345 and the rolling member 342 can flow in the axial direction.

And, the inner peripheral surface 343a of the outer member 343 and the outer peripheral surface of the intermediate support member 345 are formed as inclined surfaces corresponding to the support recess 341a and the seating recess 345a. These inclined surfaces are formed in a direction in which the diameter increases as they are directed toward the top of the ball screw 320.

Further, on the outer peripheral surface of the intermediate support member 345, a plurality of elastic protrusions 345b are formed to space apart from each other in a peripheral direction. Accordingly, the intermediate support member 345 may be elastically supported on the inner peripheral surface of the outer member 343.

Therefore, when a load in the axial direction is generated by an impact load input back to the ball screw 320 through the sector shaft 311, the elastic protrusion 345b is elastically deformed, a flow in the axial direction is made and the impact load is absorbed.

In addition, in the first embodiment of the present invention, an axial support member 360 for supporting the second rotation support member 340B in the axial direction is coupled to the inner peripheral surface of the lower end of the housing 309. The axial support member 360 supports the second rotation support member 340B in the axial direction so that a support force in the axial direction is also applied to the first rotation support member 340A coupled to the upper end of the ball screw 320.

In this way, the axial support member 360 provides an axial support force, so that the first rotation support member 340A and the second rotation support member 340B are prevented from rotating in vain or generating noise due to the gap with the ball screw 320 or the housing 309.

In addition, the inclined directions of the support recess 341a and the seating recess 345b of the first rotation support member 340A and the second rotation support member 340B are vertically symmetric. That is, the inclined direction of the first rotation support member 340A is a direction in which the diameter increases toward the lower side of the ball screw 320, and the inclined direction of the second rotation support member 340B is a direction in which the diameter increases toward the upper side of the ball screw 320. Accordingly, the ball screw 320 between the housing 309 in which the outer member 343 of the first rotation support member 340A is supported and the axial support member 360 in which the second rotation support member 340B is supported achieves vertical direction axial flow.

Figure 6:
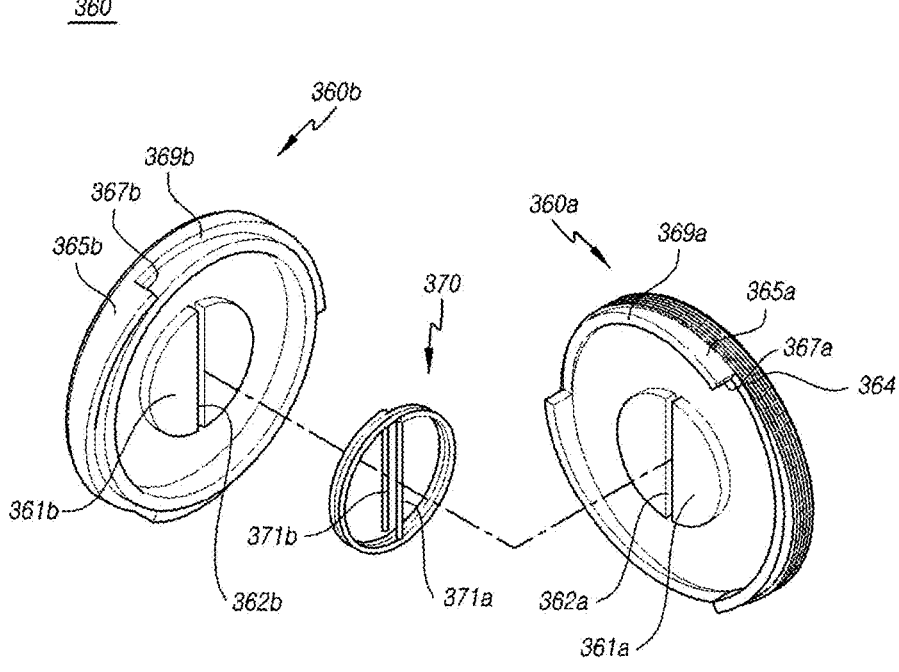
FIG. 6 is an exploded perspective view of an axial support member of an electric steering apparatus according to a first embodiment of the present invention.

Referring to FIG. 6, in the first embodiment of the present invention, the axial support member 360 is provided with a first support part 365b that protrudes from an outer peripheral surface in an axial direction wherein the protrusion increases in a peripheral direction. The embodiment comprises a first support member 360b inserted into the inner peripheral surface of the lower end portion of the housing 309 to support the second rotation support member 340B in the axial direction, a second support part 365a protruding in a shape corresponding to the first support part 365b and engaged with the first support part 365b, a second support member 360a coupled to the inner peripheral surface of the lower end portion of the housing 309, and an elastic member 370 placed between the first support member 360b and the second support member 360a, wherein one end is coupled to the first support member 360b and the other end is coupled to the second support member 360a to generate elastic force in the peripheral direction Accordingly, the first support part 365b rotates along the second support part 365a by the elastic force of the elastic member 370 in the peripheral direction, and the flow of the first support member 360b in the axial direction becomes possible.

That is, the second support member (360a) is fixed by press-fitting or screwing to the housing 309. The first support member 360b via the elastic member 370 elastically compressed comes into contact with the second support member 360a and in that state is fluidly inserted into the lower end of the inner surface of the housing 309.

More specifically, when the second support member (360a) is fixed in position to the housing (309), rotational force is transferred to the first support member (360b) by the elastic restoring force of the elastic member 370, the first support member 360b rotates and flows in the axial direction by rotating the inclined surface 369b of the first supporting portion 365b forming the inclined surface in the peripheral direction along the inclined surface 369a of the second supporting portion 365a, thereby pressurizing the second rotation support member 340.

In the first embodiment of the present invention, the second support member 360a is screwed to the housing 309. To this end, a threaded portion 364 for screwing with the inner peripheral surface of the housing 309 is formed on the outer peripheral surface of the second support member 360a.

The first support member 360b and the second support member 360a are assembled in a state in which the elastic member 370 is elastically compressed in the peripheral direction. At this time, the positions of the first support part 365b and the second support part 365a are assembled in a state in which each stop end 367b, 367a is in contact with one another. Also, at this time, the second supporting member 360a is screwed in a direction in which the stopping end 367a of the second supporting member 360a presses the stopping end 367b of the first supporting member 360b.

In addition, one side end 371b of the elastic member 370 is inserted into the engaging groove 362b of the first support member 360b so that the elastic member 370 is not separated and elastically deformed in the peripheral direction. And, the other end 371a is inserted into the engaging groove 362a of the second support member 360a.

In this way, the first support member 360 and the second support member 360a are provided with protruding fixed portions 361b and 361a, respectively, to enable the locking structure of the elastic member 370, and engaging grooves 362b and 362a are formed in each of the fixed portions 361b and 361a.

Figure 7:
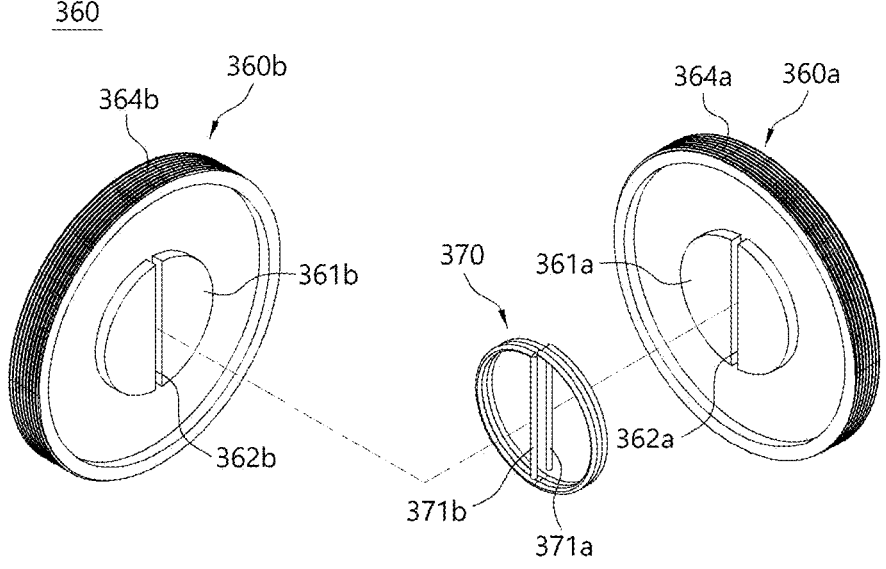
FIG. 7 to FIG. 9 are exploded perspective views of modified examples of the axial support member of the electric steering device according to the first embodiment of the present invention.
Figure 8:
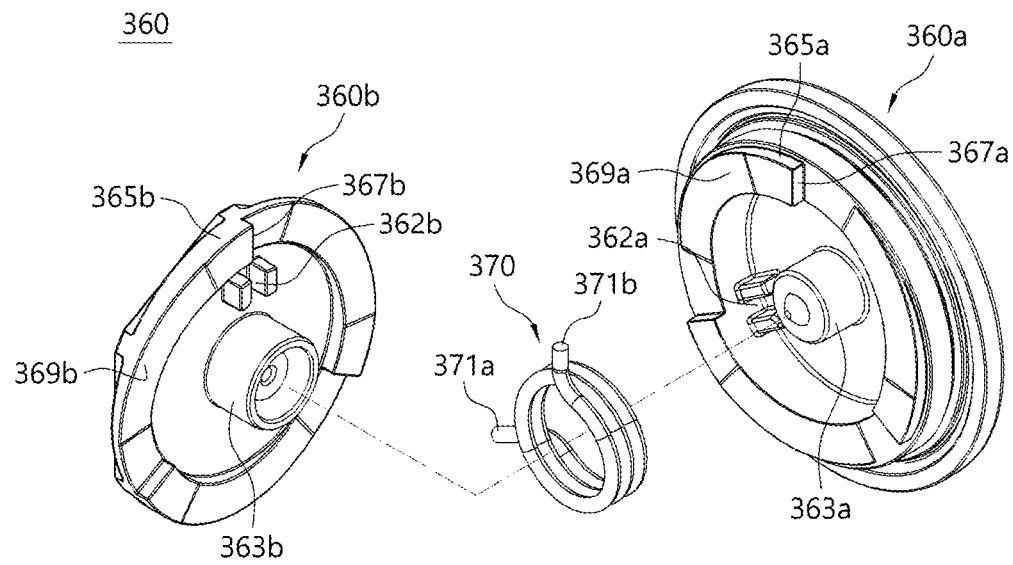
Figure 9:
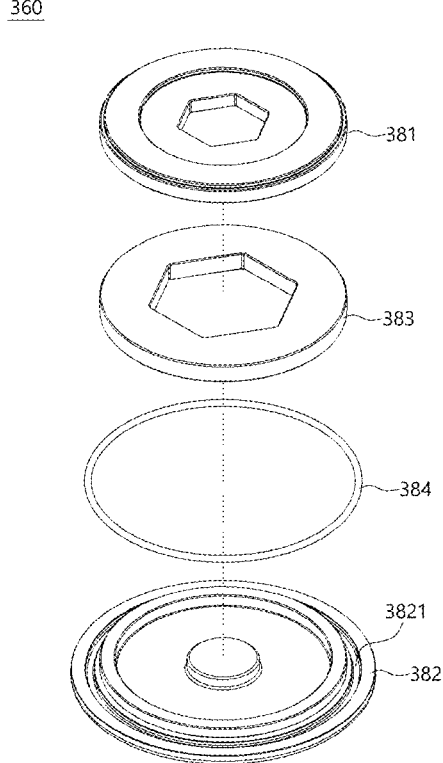

FIGS. 7 to 9 are exploded perspective views of modified examples of the axial support member of the electric steering apparatus according to the first embodiment of the present invention. With respect to FIGS. 7 to 9, it can be seen that the axial support member 360 can be modified in various ways.

A modified example of the axial support member 360 shown in FIG. 7 comprises a first support member 360b each formed with screw portions 364b, 364a that are screwed to the inner peripheral surface of the housing 309, a second support member 360a, and an elastic member 370 in which between the first support member 360b and the second support member 360a, one end is coupled to the first support member 360b and the other end is coupled to the second support member 360a to generate elastic force in the peripheral direction.

In addition, the first support member 360b and the second support member 360a are provided with protruding fixed portions (361b, 361a to enable the locking structure of the elastic member 370. Also, to this end, engaging grooves 362b, 362a are formed in each of the fixed portions 361b, 361a.

The elastic member 370 is disposed between the first support member 360b and the second support member 360a, surrounding the fixed portions (361b, 361a). The one end 371b and the other end 371a are inserted into the engaging groove 362b of the first support member 360b and the engaging groove 362a of the second support member 360a, respectively.

The first support member 360b and the second support member 260a are assembled in a state in which the elastic member 370 is elastically compressed in the peripheral direction. In this case, the first support member 360b may move upward along the thread formed on the inner peripheral surface of the housing 309 by the elastic force of the elastic member 370. Therefore, gaps due to wear and the like can be compensated.

In addition, the modified example of the axial direction support member 360 shown in FIG. 8 comprises a first support part 365b that protrudes from the outer peripheral surface in the axial direction but is formed to increase the amount of protrusion toward the peripheral direction, a first support member 360b inserted into the inner peripheral surface of the lower end of the housing 309 to support the second rotation support member 340B in the axial direction, a second support part 365a protruding in a shape corresponding to the first support part 365b and meshes with the first support part 365b, and an elastic member 370 placed between the first support member 360b and the second support member 360a, wherein one end is coupled to the first support member 360b and the other end is coupled to the second support member 360a to generate elastic force in the peripheral direction.

The first support member 360b and the second support member 360a are assembled in a state in which the elastic member 370 is elastically compressed in the peripheral direction. At this time, the positions of the first support portion 365b and the second support portion 365a are assembled in a state in which the respective stop ends 367b, 367a are in contact with one another. The second support member 360a is press-fit into the lower end of the housing 309 in the direction in which the stopping end 367a of the second supporting member 360a presses the stopping end 367b of the first supporting member 360b.

At this time, the first branch member 360a can be moved to the top by the elastic force of the elastic member 370, and through this, the gap due to wear, etc. can be compensated.

In addition, one end 371b of the elastic member 370 is inserted into the locking groove 362b of the first support member 360b so that the elastic member 370 is not separated and elastically deformed in the peripheral direction. The other end 371a is inserted into the engaging groove 362a of the second support member 360a.

In the modified example of FIG. 8, one side end 371b and the other side end 371a of the elastic member 370 protrude outward in the radial direction of the elastic member 370, and have different directions. Accordingly, the axial support member shown in the modified example of FIG. 8 may be more stably fixed compared to the axial support member shown in FIG. 6.

In addition, in the modified example of FIG. 8, the second support member 360a has a protrusion 363a protruding on one surface, the first support member 360b includes a cylinder portion 363b formed such that a protrusion 363a is inserted on a surface opposite to the second support member 360, and the elastic member 370 is disposed surrounding the outer peripheral surface of the cylinder portion 363. Accordingly, it is possible to maintain a stable axial position.

On the other hand, a modification example of the axial direction support member 360 shown in FIG. 9 comprises a first lock nut 381 inserted into the inner peripheral surface of the lower end of the housing 309 and supported in the axial direction of the second rotation support member 340B, a cover member 382 coupled while covering the lower end of the housing 309, and a second lock nut 383 disposed between the cover member 382 and the first lock nut 381 to prevent loosening of the first lock nut 381.

In the variation of FIG. 9, the cover member 382 is press-fit to the lower end of the housing 309, and O-ring grooves 3821 for inserting the O-rings 384 are formed in the edge portion of one side thereof. The O-ring 384 secures the airtightness between the cover member 382 and the housing 309.

Figure 10:
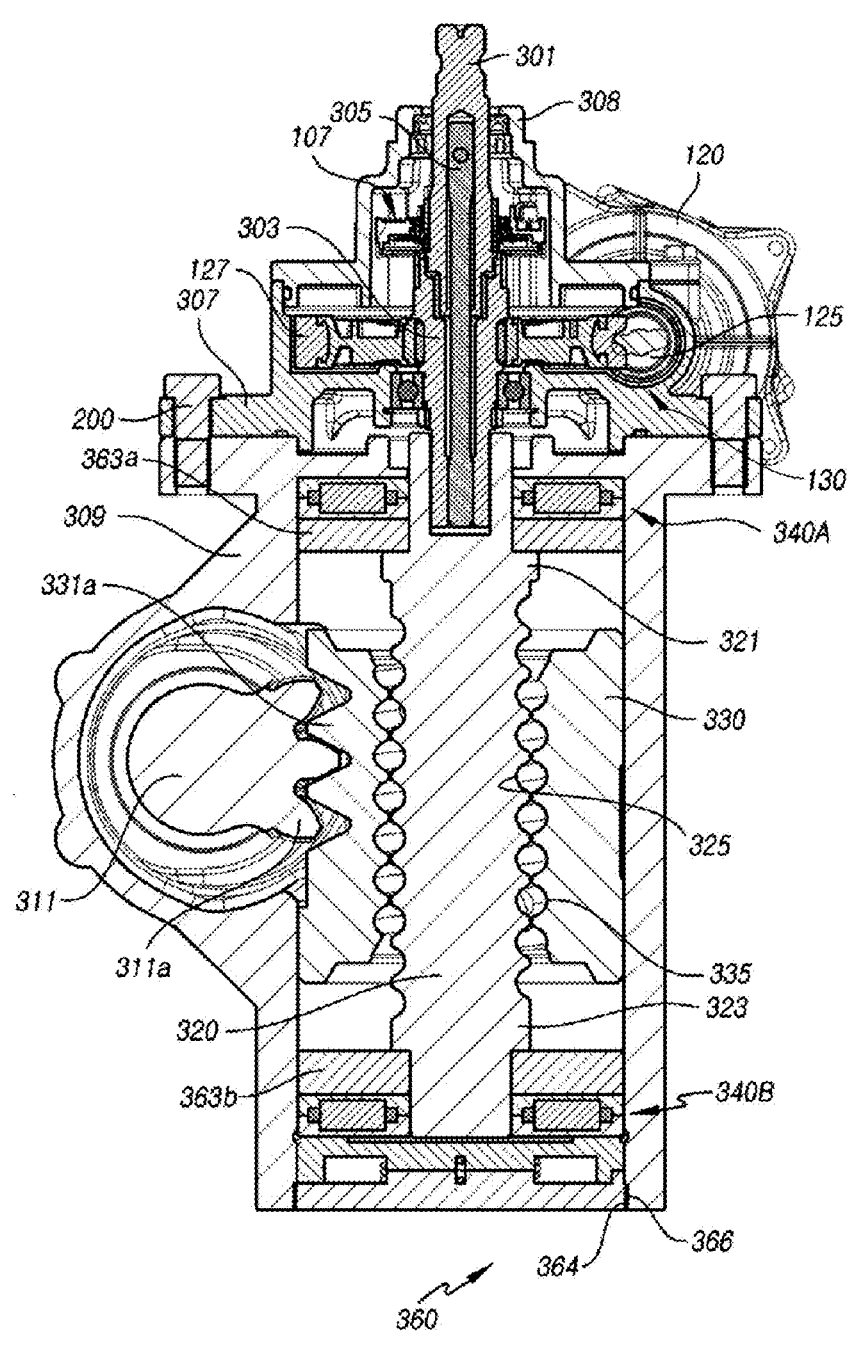
FIG. 10 is a cross-sectional view of an electric steering apparatus according to a second embodiment of the present invention.
Figure 11:
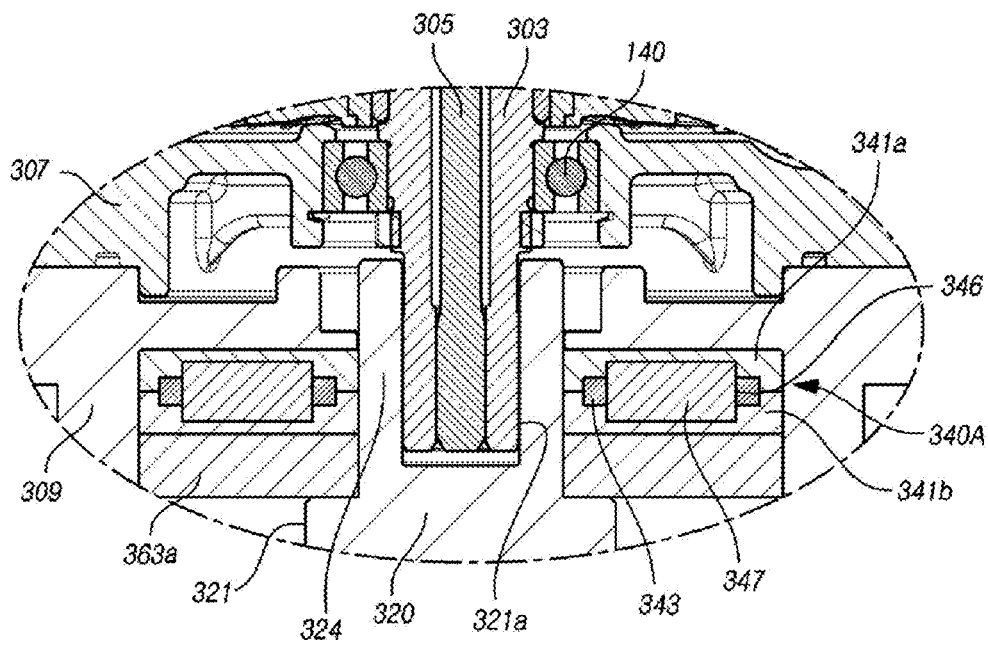
FIG. 11 and FIG. 12 are enlarged views of a part of FIG. 10, respectively.
Figure 12:
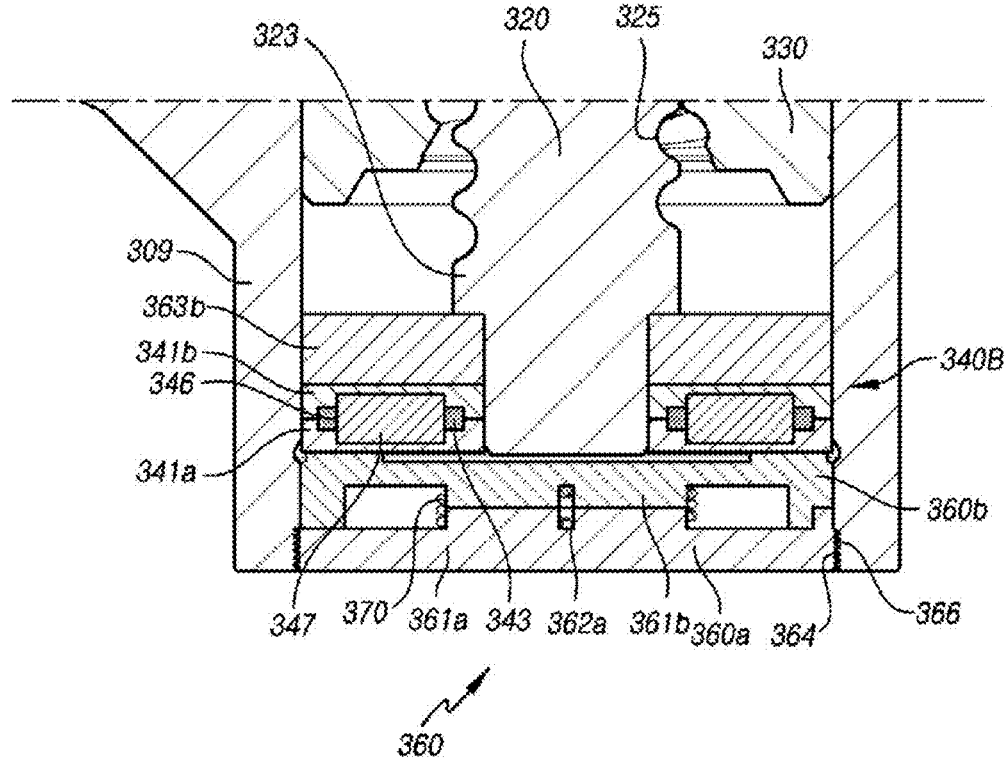

FIG. 10 is a cross-sectional view of the electric steering device according to the second embodiment of the present invention, and FIGS. 11 and 12 are enlarged views of a part of FIG. 10.

Referring to FIG. 10, the electric steering device according to the second example of the present invention is compared with the electric steering device according to the first example, and the first rotation support member And the second rotation support member 340B is made of a thrust bearing. The rest of the configuration is the same, so in relation to the second example, the first rotation is different. Only the branch member 340A and the second branch member 340B will be described.

Referring to FIG. 11, in the second embodiment of the present invention, the first rotation support member 340A is a slide of the ball nut 330 together with the radial load caused by the rotation of the ball screw 320. In order to support the load in the axial direction caused by the ding, a cylindrical roller 347 having the axial and vertical directions of the ball screw 320 as the rotation axis is inserted and supported. A pair of outer members 341a and 341b each coupled to the upper and lower sides of the inner member 343 and the inner member 343 provided with the supporting hole 346 and the inner side supported by the roller 347.

Here, the upper side of the housing 309 in which the ball screw 320 and the ball nut 330 are embedded is the driving motor 120 and the first gear member 125 and the second gear. The member 127 and the like are incorporated into the upper housing 307 and the fixing member 200, and the top cover 308 is coupled to the upper side of the upper housing 307.

The inner member 343 is formed in an annular shape. In the inner member 343, a plurality of rollers 347 are arranged radially so that they are supported in the axial direction, and a plurality of supporting holes 346 are arranged spaced apart in the peripheral direction so as to be rotated.

In addition, on the outer peripheral surface of the upper end of the ball screw 320, a first screw coupling member 363a that supports the first battery support member 340A in the axial direction is provided.

Also, the upper end jaw portion 321 is formed on the outer peripheral surface of the upper end of the ball screw 320, and the lower end of the first screw coupling member 363a is the upper end. It is supported by the jaw part 321 and is intended to be coupled.

Therefore, as shown in FIG. 1, in the first battery member 340, the outer member 341a at the top is supported on the upper inner peripheral surface of the housing 309 and is at the bottom. The outer member 341b is supported on the upper end of the first screw engaging member 363a. Through this structure, the radial load caused by the rotation of the ball screw 320 and the load in the axial direction due to the sliding of the ball nut are supported.

In addition, in the second embodiment of the present invention, the lower end of the ball screw 320 is provided with a second rotation support member 340B that supports the rotation of the ball screw 320 and the axial load.

Referring to FIG. 12, the load in the axial direction due to the sliding of the ball nut 330 together with the radial load caused by the rotation of the second rotary support member 340B In order to support the ball screw 320, a cylindrical roller 347 having the axial direction and the vertical direction of the ball screw 320 as a rotation axis is inserted and supported inside the support hole 346 The member 343 includes a pair of outer members 341a and 341b, each of which is coupled to the upper and lower sides of the inner member 343 and the inner side is supported by the roller 347.

The inner member 343 is formed in an annular shape. In the inner member 343, a plurality of rollers 347 are arranged radially to support in the axial direction, and a plurality of support holes 346 are arranged spaced apart in the peripheral direction to rotate.

In addition, on the outer peripheral surface of the lower end of the ball screw 320, a second screw coupling member 363b that supports the second rotary support member 340B in the axial direction is provided.

And, on the outer peripheral surface of the lower end of the ball screw 320, a lower end jaw part 323 is formed, and the upper end of the second screw joint member 340B is It is supported by the lower jaw portion 323 and is intended to be coupled.

Therefore, as shown in FIG. 12, the second rotary support member 340B is the outer member 341b in the upper part and the lower end of the second screw joint member 363b. The outer member 341a, which is supported on the lower part, is supported by the axial support member 360 that is coupled to the lower inner peripheral surface of the housing 309. Through this structure, the load in the axial direction due to the sliding of the ball nut 330 as well as the radial load caused by the rotation of the ball screw 320 is supported.

Figure 13:
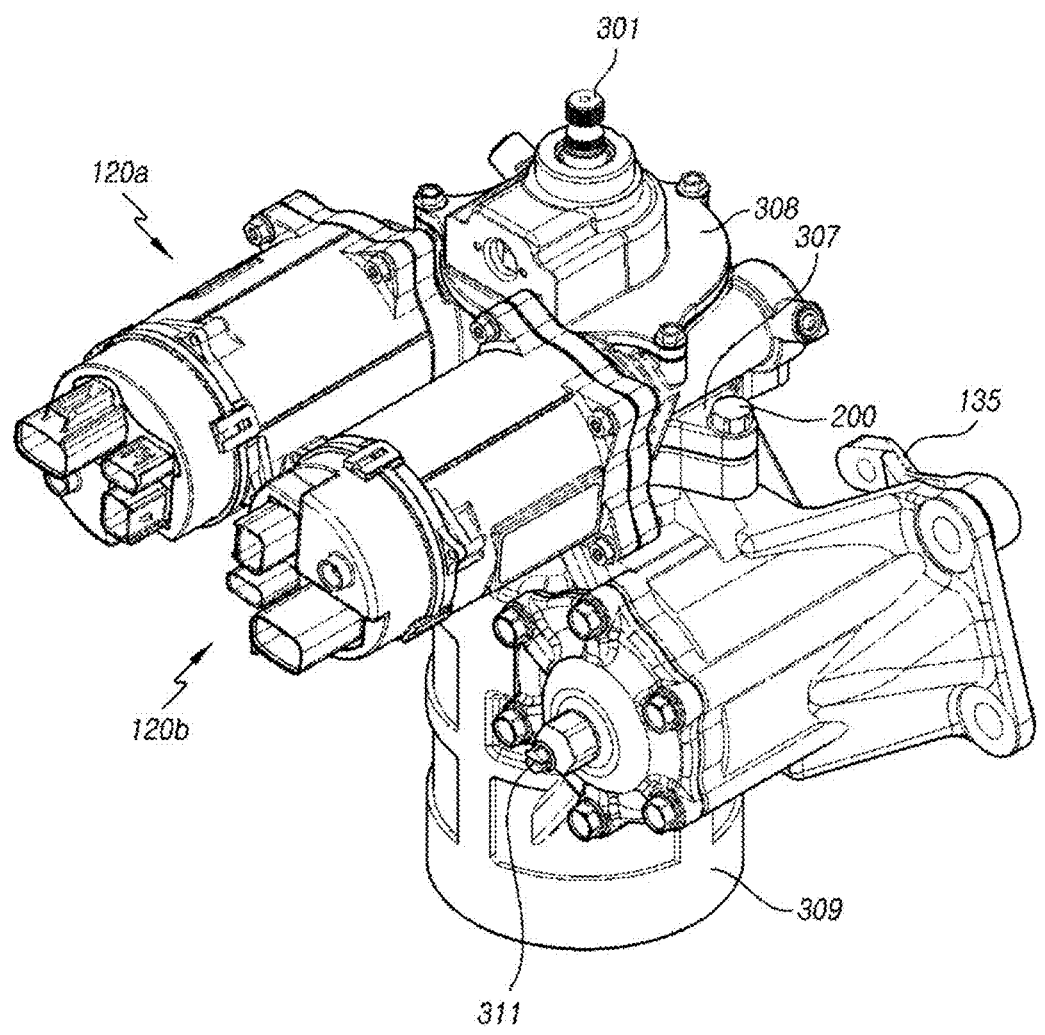
FIG. 13 is a perspective view of an electric steering apparatus according to a third embodiment of the present invention.

FIG. 13 is a perspective view of an electric steering device according to the third embodiment of the present invention.

Figure 14:
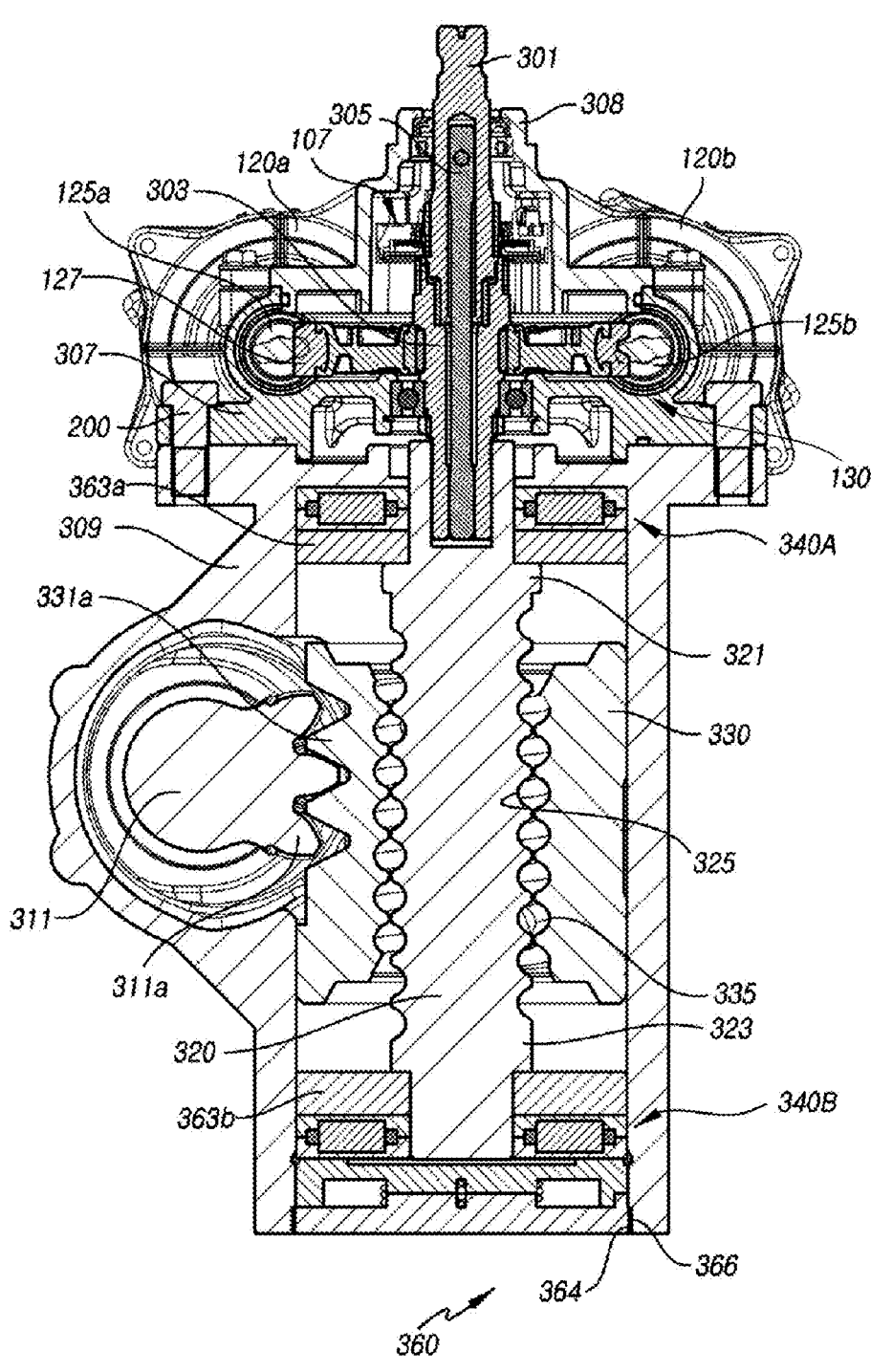
FIG. 14 is a cross-sectional view of an electric steering apparatus according to a third embodiment of the present invention.

In addition, FIG. 14 is a cross-sectional view of the electric steering device according to the third embodiment of the present invention.

In FIGS. 13 and 14, in the electric steering apparatus according to the third embodiment of the present invention, the driving motor 120 includes a first driving motor 120a and a second driving motor 120b, and the first gear The member 125 includes a first worm 125a and a second worm 125b. At this time, the first worm 125a is coupled to the first driving motor 120a, and the second worm 125b is coupled to the second driving motor 125b.

In the third embodiment of the present invention, the first driving motor 120a and the second driving motor 120b can be controlled independently. The first drive motor 120a and the second drive motor 120b are independently controlled, so that the first worm 125a coupled to the first drive motor 120a and the second drive motor 125b. The worm 125b can operate independently, thereby precisely controlling the rotation of the second gear member 127 consisting of a worm wheel meshed with the first worm 125a and the second worm 125b.

In addition, even if one of the first driving motor 120a and the second driving motor 120b becomes inoperable due to a failure while the vehicle is running, the second gear member 127 can be rotated. That is, safety performance can be secured through fail safety or redundancy.

In addition, it is preferable that the first driving motor 120a and the second driving motor 120b are adjacent and arranged side by side. It is possible to arrange the first drive motor 120a and the second drive motor 120b facing each other, but in this case it is disadvantageous in terms of the packaging of the vehicle.

The first worm 125a and the second worm 125b rotate by being coupled to the first driving motor 120a and the second driving motor 120b, respectively. At this time, the second gear member 127 rotates by being meshed with the first worm 125a and the second worm 125b, and transmits the rotational driving force to the output shaft 303.

Figure 15:
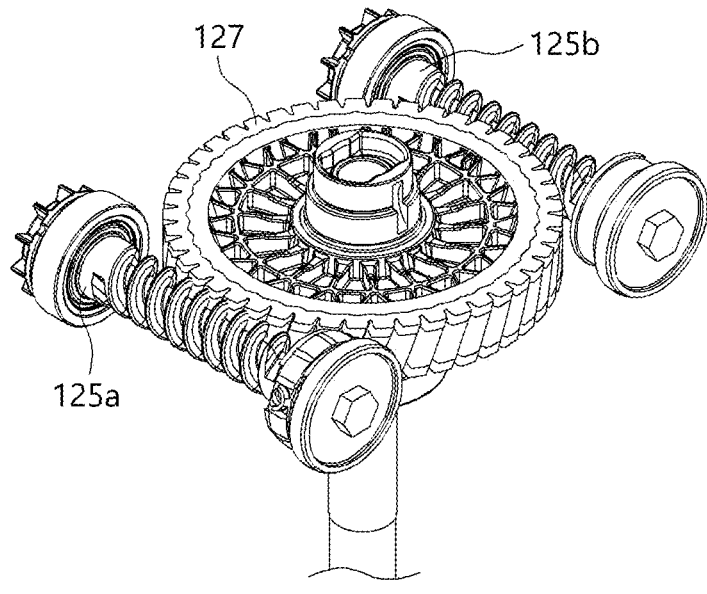
FIG. 15 is a perspective view showing an arrangement of a reduction gear of an electric steering apparatus according to a third embodiment of the present invention.

FIG. 15 is a perspective view showing the arrangement of a reduction gear of an electric steering apparatus according to a third embodiment of the present invention. As can be seen through this, the rotational axis of the first worm 125a and the rotational axis of the second worm 125b are perpendicular to the rotational axis of the second gear member 127 made of worm wheels, respectively.

In addition, the second gear member 127 transmits the rotational driving power to the ball screw 320, and the rotation shaft of the second gear member 127 and the ball screw 320 It is desirable that the rotating shafts are arranged to be consistent. In the third embodiment of the present invention, the second gear member 127 is directly coupled with the ball screw 320 on the same axis.

On the other hand, referring to FIG. 15, the first worm 125a and the second worm 125b are arranged in parallel and meshed with one side and the other side of each second gear member 127, respectively. Through this arrangement, the rotational force can be transmitted from both sides of the second gear member 127, and it is possible to prevent the occurrence of bias in the second gear member 127. As a result, a stable transmission of steering power is achieved.

Figure 16:
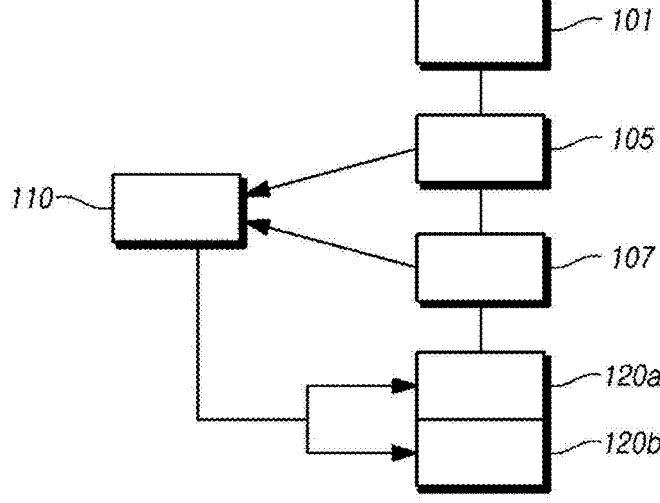
FIG. 16 is a block diagram of configurations related to driving a drive motor of an electric steering apparatus according to a third embodiment of the present invention.

FIG. 16 shows a block diagram of the configurations related to the driving of the drive motor of the electric steering device according to the third example of the present invention. Referring to FIG. 16, in the third embodiment of the present invention, the electric steering device is an angle sensor 105 and a satin that detects this when the driver's steering wheel 101 is operated. The power sensor 107 transmits an electric signal to the electronic control unit 110 and the electronic control unit 110 transmits an operation signal to the driving motor 120.

The electronic control unit 110 controls the driving motor 120 based on various electric signals transmitted from the vehicle speed sensor and the motor rotation angle sensor, in addition to the electric signals transmitted from the angle sensor 105 and the torque sensor 107.

At this time, since the driving motor 120 includes the first driving motor 120a and the second driving motor 120b, even if an error occurs in any one of the driving motors, it is possible to prevent steering failure.

In more detail, the second gear member 127 rotating the output shaft 303 receives driving power from both sides of the first driving motor 120a and the second driving motor 120b. And even if any one of the first driving motor (120a) and the second driving motor (120b) is inoperable, the driving force can be generated.

In this case, the electronic control unit 110 transmits electrical signals from the angle sensor 105 and torque sensor 107, the vehicle speed sensor installed in the vehicle, and the motor rotation angle sensor. Based on the electrical signals, the first driving motor 120a and the second driving motor 120b are simultaneously controlled. In addition, in some cases, when one motor becomes inoperable or requires a greater steering power, a higher output power can be generated for the other motor.

That is, the electronic control unit 110 compares a signal such as a motor rotation angle sensor, which detects the operating state of each of the first driving motor 120a and the second driving motor 120b, with preset data. If it is judged that either motor is inoperable or has an output error, the output of the other motor is increased or decreased accordingly.

Figure 17:
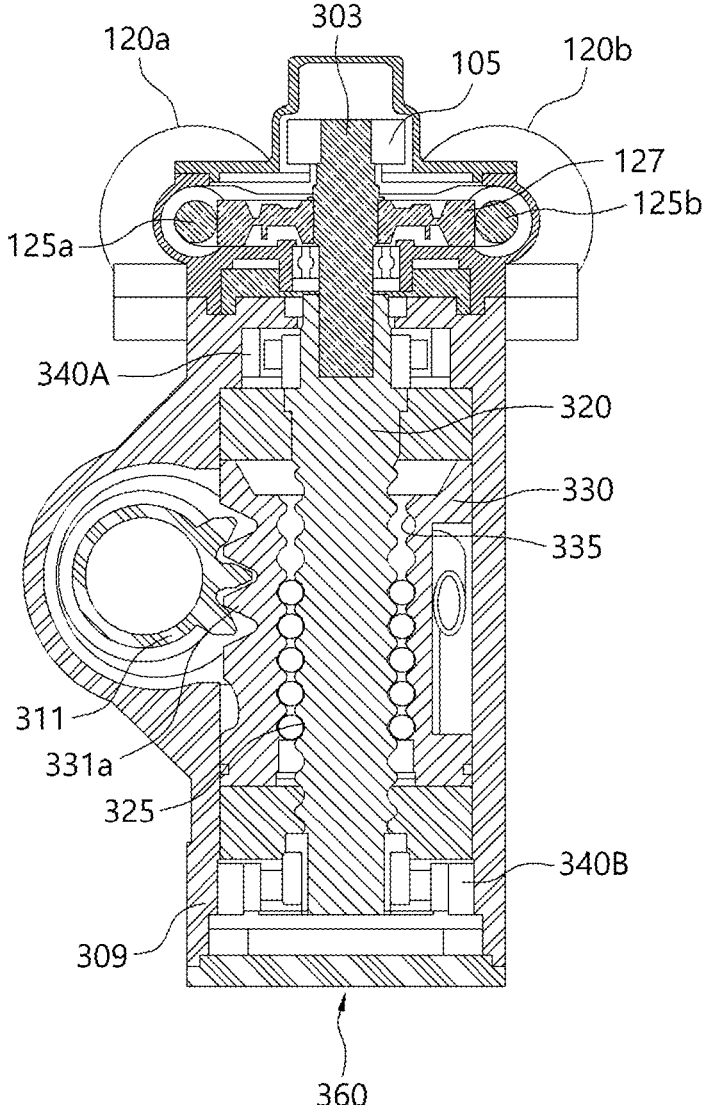
FIG. 17 is a cross-sectional view of an electric steering apparatus according to a fourth embodiment of the present invention.

FIG. 17 is a cross-sectional view of an electric steering device according to the fourth embodiment of the present invention. Referring to FIG. 17, the electric steering device according to the fourth embodiment of the present invention has no mechanical connection between the output shaft 303 and the steering wheel 101, and can be applied to the steer-by-wire system.

In a steer-by-wire system, the electronic control unit 110 generates control information based on steering input information. Here, the steering input information is information entered through the steering input stage of the steer by wire system. For example, the steering input information is operated by the driver. It may be information that includes any one or more of the rotation angle and torque of the steering wheel, and it is not the steering wheel operated by the driver. It can also be a steering signal from the stem.

The electric steering device according to the fourth example of the present invention is mechanically designed, except that there is no input shaft connecting the output shaft 303 and the steering wheel 101. The composition is substantially the same as the practical examples of the present invention as we saw earlier. In addition, in the fourth embodiment of the present invention, the angle sensor 105 is coupled to the upper end of the output shaft 303.

Figure 18:
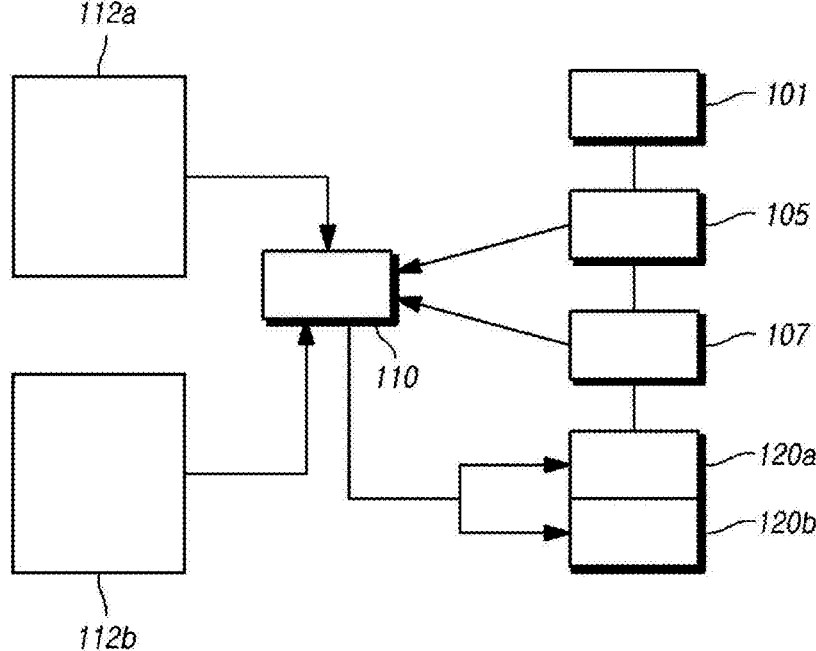
FIG. 18 is a block diagram of configurations related to driving a drive motor of an electric steering apparatus according to a fourth embodiment of the present invention.

FIG. 18 shows a block diagram of the configurations related to the driving of the drive motor of the electric steering device according to the fourth example of the present invention. Referring to FIG. 18, the electronic control unit 110 is based on the traffic lights received from the angle sensor 105 and the torque sensor 107, the first driving motor 120a and the second driving motor 120b is controlled at the same time.

In addition, based on the detection information of the operating state of the first driving motor (120a) and the second driving motor 120b, one of the motors becomes inoperable or requires greater steering power. In this case, it can generate a higher output to the other motor.

In more detail, the electronic control unit 110 includes a first motor sensor unit 112a for sensing an operating state of the first driving motor 120a and a second motor sensor for sensing an operating state of the second driving motor 120b. It is possible to control the first driving motor 120a and the second driving motor 120b based on the sensing signal received from the unit 112a.

For example, the first motor sensor unit 112a includes a first current sensor that senses the operating current of the first driving motor 120a, and the second motor sensor unit 112b is the second driving motor 120b. It may include a second current sensor sensing the operating current of. At this time, the electronic control unit 110 compares the signal received from the first current sensor and the signal received from the second current sensor and is able to control signal transmissions to the first driving motor 120a and the second driving motor 120b respectively.

Accordingly, the current sent from the electronic control unit 110 to the first driving motor 120a is different from the current detected by the first current sensor, or the second driving motor 120b in the electronic control unit 110. When the current sent to the second current sensor is different from the current detected by the second current sensor, the operation of the first driving motor 120a or the second driving motor 120b is judged as abnormal.

If the first drive motor 120a is judged to be abnormal, the electronic control unit 110 can increase or decrease the current sent to the second drive motor 120b. Also, if the first drive motor 120b is judged to be abnormal, the electronic control unit 110 can increase or decrease the current sent to the first drive motor 120a.

On the other hand, the 1st motor sensor part 112a includes the 1st rotation sensor which detects the rotation angle of the 1st driving motor 120a, and the 2nd motor sensor part 112b is It may include a second rotation sensor for sensing the rotation angle of the second drive motor 120b. At this time, the electronic control unit 110 compares the signal received from the first rotation angle sensor and the second rotation angle sensor, and compares the first driving motor 120a and the second driving motor 120b. It is also possible to control the signals transmitted individually.

Accordingly, the current sent from the electronic control unit 110 to the first driving motor 120a is different from the current detected by the first current sensor, or the electronic control unit 110. If the rotation angle of the motor corresponding to the current sent to the driving motor 120a is different from the rotation angle detected by the first rotation angle sensor, the operation of the first driving motor 120a can be judged as abnormal.

In addition, the current sent by the second drive motor 120 from the electronic control unit 110 is different from the current detected by the second current sensor, or the second drive from the electronic control unit 110. If the rotation angle of the motor corresponding to the current sent to the motor 120b is different from the rotation angle detected by the second rotation angle sensor, the operation of the second drive motor 120b can be judged as abnormal.

In particular, when the first driving motor 120a does not operate, such as when the current detected by the first current sensor and the first rotation angle sensor and the rotation angle of the motor are "0". In this case, by controlling the current sent from the electronic control unit 110 to the second drive motor 120*b* to the maximum, steering stability can be maintained.

In other words, by judging the signals received from the first and second current sensors or the first and second sensors, it is determined that either motor is inoperative or has an output error If so, it is possible to maximize steering stability by increasing or decreasing the output of the other motor accordingly.

As explained above, according to the practical examples of the present invention, the driver's ability to operate in the case of a truck or bus that requires relatively large steering power compared to a passenger car The driver can use additional functions such as automatic parking, lane maintenance, driving assistance according to the road surface condition, and autonomous driving control that control the vehicle regardless of the will to steer. There is an effect that can increase the convenience of people.

In the above, it is said that all the constituent elements constituting the practical examples of the present invention are combined or operated in combination. They are not necessarily limited to these examples. That is, as long as it is within the scope of the purpose of the practical examples of the present invention, all of the constituent elements may be selectively combined and operated in one or more ways.

The above explanation is merely an illustrative explanation of the technical idea of the examples of the present invention, and those who have ordinary knowledge in the technical field to which the examples of the present invention belong. If so, various modifications and variations would be possible within a range that does not depart from the essential characteristics of the practical examples of the present invention. Therefore, the examples disclosed in the examples of the present invention are not intended to limit the technical idea of the examples of the present invention, but to explain, The scope of the technical idea of the present invention is not limited by these examples. The scope of protection of the present invention must be interpreted according to the scope of the claims below, and all technical thoughts within the scope of the same are the scope of the rights of the present invention. It should be interpreted as being included above.

The invention claimed is:

1. An electronic steering device, comprising:
an output shaft rotated by a reduction gear connected to a drive motor;
a ball screw rotatable in conjunction with said output shaft, wherein said ball screw has an upper end coupled to a lower end of said output shaft, and wherein said ball screw has outer peripheral screw threads formed on an outer peripheral surface thereof;
a ball nut having gear teeth formed on an outer peripheral surface thereof and inner peripheral screw threads formed on an inner peripheral surface thereof, wherein said inner peripheral screw threads correspond to said outer peripheral screw threads, wherein said ball nut is coupled to said ball screw via a ball, and wherein said ball nut slides in an axial direction;
a sector shaft coupled to said gear teeth of said ball nut for operating a pitman arm by rotating while said ball nut slides in an axial direction;
one or more rotation supports disposed between a housing and the ball screw to support rotation of the ball screw; and
an axial support having an elastic member configured to generate an elastic force in a circumferential direction to support one of the rotation supports in the axial direction, wherein the one or more rotation supports disposed between the housing and the ball screw are coupled between the ball screw and the axial support and directly coupled to the ball screw,
wherein said axial support comprises:
a first support member equipped with a first support part protruding from an outer peripheral surface in the axial direction having a protrusion increasing in the circumferential direction, and inserted into an inner peripheral surface of a lower end of said housing to support the rotation support in the axial direction; and
a second support member protruding in a shape corresponding to said first support member and having a second support part engaged with said first support part, and coupled to an inner peripheral surface of a lower end portion of said housing, and
wherein the elastic member is disposed between said first support member and said second support member, and one end of the elastic member is coupled to said first support member and another end of the elastic member is coupled to said second support member to generate the elastic force in a peripheral direction.

2. The electronic steering device according to claim 1, wherein said reduction gear comprises:
a first gear member which rotates by being coupled to said drive motor and has gear teeth formed on an outer peripheral surface thereof; and
a second gear member which is a disc-shaped member to which said output shaft is coupled, and which rotates said output shaft when said drive motor rotates, wherein said second gear member has gear teeth formed on an outer peripheral surface thereof to be meshed with said first gear member.

3. The electronic steering device according to claim 2, wherein said drive motor comprises a first drive motor and a second drive motor, wherein said first gear member comprises a first worm coupled to the first drive motor to rotate and a second worm coupled to the second drive motor to rotate, wherein the second gear member is composed of a worm wheel meshed with the first worm and the second worm.

4. The electronic steering device according to claim 3, wherein the rotational shafts of the first worm and the second worm are each disposed perpendicular to the rotational axis of the second gear member.

5. The electronic steering device according to claim 3, wherein the first drive motor and the second drive motor are disposed by being arranged side by side.

6. The electronic steering device according to claim 3, wherein the first drive motor and the second drive motor are independently controlled by an electronic unit.

7. The electronic steering device according to claim 1, wherein the rotation supports comprise:
a first rotation support disposed between the housing and an external circumference of one end of said ball screw to support the rotation of said ball screw; and
a second rotation support disposed between the housing and an outer peripheral surface of another end of said ball screw to support the rotation of said ball screw.

8. The electronic steering device according to claim 7, wherein said first rotation support and said second rotation support are composed of tapered roller bearings.

9. The electronic steering device according to claim 7, wherein said first rotation support and said second rotation support are composed of thrust bearings.

10. The electronic steering device according to claim 7, wherein the axial support is coupled to an inner peripheral surface of a lower end of said housing and supports said second rotation support in the axial direction.

11. The electronic steering device according to claim 10, wherein said axial support comprises:

a first lock nut inserted into the inner peripheral surface of a lower end of the housing to support the second rotation support in the axial direction;

a cover member that covers the lower end of the housing and is joined together; and a second lock nut disposed between the cover member and the first lock nut to prevent loosening of the first lock nut.

12. The electronic steering device according to claim 1, wherein the output shaft is not mechanically connected to a steering wheel, and wherein the drive motor is controlled by an electronic control unit based on a steering angle detected by an angle sensor when the steering wheel is operated.

13. The electronic steering device according to claim 1, wherein the sector shaft is engaged with the gear teeth of the ball nut so that the ball nut rotates in one side in the axial direction in a sliding seal direction, and rotates in the other direction when the ball nut slides in the other axial direction.

14. The electronic steering device according to claim 1, wherein the one or more rotation supports disposed between the housing and the ball screw are positioned between the ball screw and the axial support in an axial direction of the ball screw.

15. An electronic steering device, comprising:

an output shaft rotated by a reduction gear connected to a drive motor;

a ball screw rotatable in conjunction with said output shaft, wherein said ball screw has an upper end coupled to a lower end of said output shaft, and wherein said ball screw has outer peripheral screw threads formed on an outer peripheral surface thereof;

a ball nut having gear teeth formed on an outer peripheral surface thereof and inner peripheral screw threads formed on an inner peripheral surface thereof, wherein said inner peripheral screw threads correspond to said outer peripheral screw threads, wherein said ball nut is coupled to said ball screw via a ball, and wherein said ball nut slides in an axial direction; and a sector shaft coupled to said gear teeth of said ball nut for operating a pitman arm by rotating while said ball nut slides in an axial direction, wherein said reduction gear comprises:

a first gear member configured to rotate by being coupled to said drive motor; and a second gear member coupled to said output shaft and having gear teeth formed on an outer peripheral surface thereof to be meshed with said first gear member, wherein said first gear member comprises a first worm coupled to the first drive motor and a second worm coupled to the second drive motor, and wherein the first worm and the second worm are arranged side by side on both sides of the second gear member.

16. An electronic steering device, comprising:

an output shaft rotated by one reduction gear connected to a drive motor;

a ball screw wherein an upper end is coupled to the lower end of the output shaft, and an outer screw groove is formed on the outer peripheral surface to rotate in connection with the output shaft; and a ball nut wherein a gear tooth is formed on the outer peripheral surface, and an inner main screw groove corresponding to the outer main screw groove is formed on the inner peripheral surface, wherein the drive motor includes a first drive motor and a second drive motor, wherein the one reduction gear is rotatably engaged with a first worm coupled to the first drive motor and a second worm coupled to the second drive motor, and the one reduction gear includes a worm wheel engaged with the first worm and the second worm.

17. The electronic steering device according to claim 16, wherein the first worm and the second worm are arranged side by side on both sides of the worm wheel.

18. The electronic steering device according to claim 16, wherein the rotation axis of the first worm and the second worm are each disposed perpendicular to the rotation axis of the worm wheel.

19. The electronic steering device according to claim 16, wherein the first drive motor and the second drive motor are arranged adjacent to each other.

* * * * *